3,256,156
PROCESS FOR PRODUCING OPTICALLY-ACTIVE α-ALKYL-SUBSTITUTED PHENOXYACETIC ACIDS
Werner Frommer, Wuppertal-Elberfeld, Hermann Kubin, Cologne-Mulheim, and Erich Rauenbusch, Wuppertal-Elberfeld, Germany, assignors to Farbenfabriken Bayer Aktiengesellschaft, Leverkusen, Germany, a corporation of Germany
No Drawing. Filed Sept. 11, 1962, Ser. No. 222,941
Claims priority, application Germany, Sept. 16, 1961, F 34,939
4 Claims. (Cl. 195—30)

This invention relates, in general, to novel optically-active α-alkyl-substituted phenoxyacetic acids and to a unique biochemical synthesis for the production of such compounds. The invention further contemplates the provision of novel optically-active amide derivatives of the substituted-phenoxyacetic acids of the invention.

The invention is based, in part, on our discovery that optically-active substituted phenoxyacetic acids, which are substituted at the α-carbon atom with an alkyl radical, i.e., optically-inactive equimolecular mixtures of the D— and L–acids, can be produced from their dextro- and levorotatory raceme compound, by initially transforming acid racemic-substituted phenoxyacetic acids into their amides, preferably the butyl amides, exposing these amides in an aqueous medium to the action of selective microorganisms or extracts obtained from such microorganisms as, for example, a fungus of the genus Fusarium or Cephalosporium, and, following the complete hydrolysis of one of the optically-isomeric amides, separating the optically - active substituted - phenoxyacetic acid thus formed and, if desired, hydrolyzing the remaining optically-active amide component in accordance with conventional techniques, such as acid hydrolysis, and separating the enantiomeric acid thus produced.

In effecting the above-described dissociation, use is made of the selected microorganisms or their extracts, for which the substituted phenoxyacetic acid amides to be dissociated suffice as the only carbon source. Microorganisms of the general class described can be obtained by placing specimens on solid culture media which, in addition to the amides to be dissociated, contain a suitable nitrogen source, such as sodium nitrate, and the usual inorganic nutrient salts. Following a further selection in liquid culture media of the same composition, one obtains strains of microorganisms which are suitable for effecting the biosynthesis of the invention. One strain in particular which we isolated in this manner was deposited (on July 14, 1961) and is being maintained under the designation A8 in the collection of the Centraalbureau voor Schimmelcultures in Baarn, Netherlands. Our investigations demonstrate that this microorganism belongs to the fungi imperfecti. The determination has shown that the strain A8 is identical with *Fusarium oxysporum*. Other strains of *Fusarium oxysporum* for example strain Kerling and ten Houten obtained from the Centraalbureau voor Schimmelcultures, Baarn, were also useful in the process of the invention.

The process of the invention is particularly suitable for the production of L-α-phenoxybutyric acid from the raceme D,L-α-phenoxybutyric acid. This may be accomplished by transforming the D,L-α-phenoxybutyric acid into its isobutyl amide, for example, reacting the amide in an aqueous medium with the aforementioned fungus A8, or an extract obtained from said fungus and following the hydrolysis of D,L-α-phenoxybutyric acid isobutyl amide only D-α-phenoxybutyric acid is formed. After separation of the D-α-phenoxy butyric acid from the residual L-α-phenoxy butyryl isobutyl amide, the amide can be hydrolyzed in known manner to yield L-α-phenoxy butyric acid.

The products of the invention are valuable intermediates for use in the synthesis of drugs and plant protective agents. For example, as will be readily apparent to the skilled technician, the products are particularly suitable for the production of semi-synthetic penicillins.

It is believed that the invention may be best understood by reference to the following specific examples illustrating the application of the foregoing principles and procedures to the production of typical optically-active α-alkyl-substituted phenoxyacetic acids:

Example I

Suspension of soil specimens in suitable dilutions were placed on Petri dishes with culture media containing 0.2% of sodium nitrate and 0.1% $K_2HPO_4$, 0.05% $MgSO_4$, 0.05% KCl, 0.01% $FeSO_4$, 2% agar and 0.5% DL-α-phenoxybutyryl-isobutyl amide as the sole carbon source. After incubation at 28° C. for some seven (7) to ten (10) days, a number of colonies appeared on the plates from which the aforementioned A8 species was isolated.

A thousand cubic centimeters-Erlenmeyer flask containing 100 cubic centimeters nutrient solution of the above composition was sterilized, inoculated with a spore suspension of strain A8 and was incubated at 28° C. on a rotary shaker. After seven (7) days incubation, the pH was adjusted to 7.0, and the amide extracted with ethyl acetate. The organic phase was then dried, filtered and the solvent evaporated to dryness in vacuum. The residue consisted of L(—)-α-phenoxybutyryl-isobutyl amide.

The aqueous phase was adjusted to ph 2.0 with 2 N hydrochloric acid, and was subsequently extracted with ethyl acetate, and the ester phase evaporated to dryness. The residue consisted substantially entirely of D(+)-α-phenoxybutyric acid. The respective yields and optical rotations for these products are given in Table I, whereas the rotation values of the pure isomers are:

D(+)-α-phenoxybutyric acid $[\alpha]_D^{20}=+65.6°$ (c.=1.9% in acetone)

L(—)-α-phenoxybutyryl - isobutyl amide $[\alpha]_D^{20}=39.8°$ (c.=1.0% in acetone)

TABLE I

| | Weight Quantity (grams) | Percent of Theoretical | $[\alpha]_D^{20}$ in acetone c.=~1 | Percent Purity of Isomers |
|---|---|---|---|---|
| L(—) amide | 0.233 | 94 | −37.4 | 97 |
| D(+) acid | 0.172 | 90 | +61.9 | 97 |

The L(—) amide as thus isolated may be readily hydrolyzed in known manner to yield L(—)-α-phenoxybutyric acid as, for example, by hydrolysis with acids.

Example II

A thousand cubic centimeters-Erlenmeyer flask containing 100 cubic centimeters of the nutrient solution prepared in accordance with the preceding example, but with the addition of 0.05% glucose, was sterilized, inoculated with a spore suspension of strain A8, as isolated in accordance with the procedure of Example I, and then incubated at 28° C. on a rotary shaker. Following seven (7) days incubation, the pH was adjusted to 7.0, and the amide extracted with ethyl acetate. The organic phase was dried, filtered and the solvent evaporated in vacuum. The residue consisted of L(—)-α-phenoxybutyryl-isobutyl amide.

The aqueous phase was adjusted to pH 2.0 with 2 N hydrochloric acid, subsequently also extracted with ethyl acetate, and the ester phase evaporated to dryness. The residue consisted almost entirely of D(+)-α-phenoxybutyric acid. The yields and rotation values for these products are listed in Table II below:

TABLE II

|  | Weight Quantity (grams) | Percent of Theoretical | $[\alpha]_D^{20}$ in acetone c.=~1 | Percent Purity of Isomers |
|---|---|---|---|---|
| L(−) amide | 0.221 | 88 | −35.7 | 95 |
| D(+) acid | 0.160 | 84 | +62.6 | 98 |

*Example III*

A thousand cubic centimeters-Erlenmeyer flask containing 100 cubic centimeters of the nutrient solution prepared in accordance with the procedure of Example I, with the addition of 0.2% glucose and containing 2% rather than 0.5% of DL-α-phenoxybutyryl-isobutyl amide, was sterilized, inoculated with a spore suspension of strain A8, isolated as described in Example I, and incubated at 28° C. on a rotary shaker. Following seven (7) days incubation, the pH was adjusted to 7.0, and the amide extracted with ethyl acetate. The organic phase was dried, filtered and the solvent evaporated in vacuum. The residue consisted of L(−)-α-phenoxybutyryl-isobutyl amide.

The aqueous phase was adjusted to pH 2.0 with 2 N hydrochloric acid, subsequently also extracted with ethyl acetate, and the ester phase evaporated to dryness. The residue consisted almost entirely of D(+)-α-phenoxybutyric acid. The yields and rotational data for these products are listed below in Table III:

TABLE III

|  | Weight Quantity (grams) | Percent of Theoretical | $[\alpha]_D^{20}$ in acetone c.=~1 | Percent Purity of Isomers |
|---|---|---|---|---|
| L(−) amide | 1.053 | 106 | −34.4 | 93 |
| D(+) acid | 0.722 | 94 | +63.7 | 99 |

*Example IV*

A ten (10) liters-glass fermenter containing 8 liters of the nutrient solution of Example I, but containing 0.05% glucose, was sterilized, inoculated with two well-grown shake cultures (prepared in accordance with the procedure of Example I), and incubated in a water bath at 28° C. under conditions of continuous stirring and aeration. Specimens were withdrawn daily and after four (4) days the mixture was further processed in the manner described in Example I to yield the products as summarized in Table IV below:

TABLE IV

|  | Withdrawal after— | | | Weight Quantity (grams) | Percent of Theoretical | $[\alpha]_D^{20}$ | Percent Purity of Isomers |
|---|---|---|---|---|---|---|---|
|  | 1 day $[\alpha]_D^{20}$* | 2 days $[\alpha]_D^{20}$* | 3 days $[\alpha]_D^{20}$* |  |  |  |  |
| L(−) amide | −2.5 | −36.2 | −36.2 | 18.0 | 90 | **−38.7 | 99 |
| D(+) acid | +54.6 | +61.0 | +60.6 | 11.2 | 74 | +62.4 | 98 |

*Optical rotation, in acetone (c.=1%).
**Product recrystallized once from petroleum ether.

*Example V*

A one-liter-Erlenmeyer flask containing 100 cubic centimeters of the nutrient solution of Example 1, but containing in lieu of the DL-α-phenoxybutyryl-isobutyl amide, the DL-α-phenoxypropionyl-isobutyl amide, was inoculated with a spore suspension of strain A8, and incubated for four (4) days at 28° C. on a rotary shaker. The resulting mixture was treated in accordance with the procedure of Example I to isolate in a purity of 84% D(+)-α-phenoxypropionic acid at a $[\alpha]_D$-value of +36.2°. (The rotation of pure D(+)-α-phenoxypropionic acid-$[\alpha]_D^{20}$=+53.7°; c.=0.4% in acetone.)

*Example VI*

By utilizing DL-α-phenoxybutyryl-n-butyl amide in the mixture as prepared in accordance with the preceding example, and incubating the same for 11 days as above, the acid D(+)-α-phenoxybutyric acid is isolated in a purity of 97% with $[\alpha]_D^{22}$=+61.8°.

*Example VII*

Repeating the procedure described in Example VI, but adding 0.1% glucose to the mixture, and incubating for only six (6) days, the acid D(+)-α-phenoxybutyric is obtained in a purity of 94% with $[\alpha]_D^{22}$=58.1°.

*Example VIII*

Twenty-four (24), one-thousand-cubic centimeters-Erlenmeyer flasks, each containing 100 cubic centimeters of the nutrient solution as prepared in accordance with Example I, but containing in place of the 0.5% DL-α-phenoxybutyryl-isobutyl amide, only 0.1% D,L-α-phenoxybutyryl-isobutyl amide and 0.1% glucose, were inoculated with a spore suspension of Strain A8, and incubated on a rotary shaker. After an incubation period of five (5) days, the contents of all of the flasks were combined and the mycelium separated by centrifuging. For complete removal of D(+)-α-phenoxybutyric acid and L(−)-α-phenoxy butyryl isobutylamide, the mycelium was suspended twice in water and separated by centrifuging; it was then introduced into M/40 phosphate buffer (pH 7.0) and disintegrated with sharp-edged quartz sand in a starmix while cooling with ice. The cell fragments thus obtained were separated by centrifuging, the clear supernatant enzyme extract filtered sterile, and filled up to 120 milliliters.

Two (2) one-thousand cubic centimeters-Erlenmeyer flasks each containing 30 milliliters of the nutrient solution described in Example I, but containing instead of 0.5%, only 0.17% D,L-α-phenoxy butyryl isobutyl amide and 60 milliliters of the enzyme extract, were incubated at 28° C. while stirring continuously. After a reaction time of three (3) days, the mixture was treated in the manner described in Example I to yield the following results:

|  | Weight Quantity, mg. | Percent of Theoretical | $[\alpha]_D^{20}$ in acetone c.=1 | Percent Purity of Isomers |
|---|---|---|---|---|
| L(−) amide | 68.3 | 137 | −10.3 | 63 |
| D(+) acid | 20.2 | 53 | +52 | 90 |

The L(−)-α-phenoxyalkyl alkyl amides are useful in the synthesis of levorotatory phenoxyacetyl amino penicillanic acids, substituted in the α-position by alkyl radicals. An example of such useful phenoxy acetyl amino penicillanic acids is L-α-phenoxy propyl penicillin (L-propicillin).

The following example shows the conversion of L(−)-α-phenoxy butyryl isobutyl amide into L-propicillin.

*Example IX*

23.5 g. of L(−)-α-phenoxy butyryl isobutyl amide ($[\alpha]_D^{22} = -38.0$; c.=1% in acetone) is heated in an autoclave with 300 ml. of 20% hydrochloric acid to 134° C. for ten hours. After cooling the mixture is rendered alkaline by addition of sodium hydroxide solution. It is shaken with ethyl acetate in order to remove residual traces of amide. Then the aqueous phase is rendered acid and again extracted with ethyl acetate. The organic phase is washed with a little water, dried over anhydrous sodium sulfate and the solvent evaporated. The residue is pure L-α-phenoxy butyric acid. The yield is 16.9 g. (94% of the theoretical); $[\alpha]_D^{22} = -59.7$; c.=1% in acetone. Under the conditions selected for hydrolysis racemization is practically avoided.

16.9 g. of well dried L-α-phenoxy butyric acid are dissolved in 50 ml. of anhydrous benzene and 15 ml. of thionyl chloride are added. The mixture is slowly heated on a water bath with exclusion of moisture until the formation of hydrogen chloride ceases. Thereupon the benzene and excess thionyl chloride are evaporated in vacuo and the residue distilled in vacuo. At a pressure of 12 mm. it boils at 117° C. The yield of L-α-phenoxy butyryl chloride is 17.6 g. (95% of the theoretical).

A suspension of 19.2 g. of 6-amino penicillanic acid, 10 g. of magnesium carbonate in 100 ml. water and 100 ml. ethyl ether are stirred for 30 minutes. Thereupon a solution of 17.6 g. of L-α-phenoxybutyryl chloride in 30 ml. of ether is dropped in while stirring strongly for one hour. The suspension is filtered off and the residue washed with a little water. The ether phase is separated and discarded. The aqueous solution is acidified while cooling with ice with 1 N-sulfuric acid to pH 2. The oil which separates is extracted with ether. The ether phase is washed with ice-cool water, dried with anhydrous sodium sulfate and diluted with about one quarter of its volume of anhydrous acetone. To this solution there is added with care 20 ml. of 1 N-potassium-2-ethyl-hexanoate in acetone. After the crystallization sets in the addition can be accelerated. After standing for 30 minutes at 0° C. the crystalline L-propicillin is filtered off by suction, washed with some anhydrous acetone and dried in a vacuo at 50° C. The yield is 28.2 g., which is 76% of the theoretical. The specific rotation is $[\alpha]_D^{22} = 185°$; c.=3% in water.

We claim:

1. Process for the production of optically-active phenoxyacetic acids substituted at the alpha-carbon atom with a lower alkyl from racemic compounds of the same, that comprises converting such a racemic alpha-alkyl substituted phenoxyacetic acid into a member of the group consisting of the n-butylamide and iso-butylamide raceme, subjecting said amide raceme in aqueous medium to the action of the fungus *Fusarium oxysporum* to effect complete hydrolysis of one of the optically-isomeric amides of said raceme, and separating and recovering from the reaction mixture the enantiomeric alpha-alkyl-substituted phenoxyacetic acid thus produced.

2. The process as claimed in claim 1, that further comprises treating the residual reaction mixture by acid hydrolysis to hydrolyze the remaining optically-active amide of the original raceme compound, and separating and recovering the enantiomeric α-alkyl-substituted phenoxyacetic acid thus produced.

3. Process for the production of L-α-phenoxybutyric acid from the raceme D,L-α-phenoxybutyric acid that comprises, converting said D,L-α-phenoxybutyric acid into its isobutyl amide, subjecting said amide raceme compound in aqueous medium to the action of a microbiologically active agent selected from the group consisting of the fungus *Fusarium oxysporum* and extracts of the same to effect complete hydrolysis of the D-α-phenoxybutyryl-isobutyl amide, and separating and recovering from the reaction mixture the optically-active D-α-phenoxybutyric acid thus produced.

4. The process as claimed in claim 3, that further comprises treating the residual L-α-phenoxybutyryl-isobutyl amide by acid hydrolysis for the production and recovery of L-α-phenoxybutyric acid.

References Cited by the Examiner

UNITED STATES PATENTS 2,616,828   11/1952   Levintow et al. _____ 260—588 X

OTHER REFERENCES

Beilsteins Handbuch, vol. 6, 4th ed., p. 158 (1944).

Finar: Organic Chemistry, vol. II (Stereochemistry and the Chemistry of Natural Products), 2nd ed., pp. 60–66 and 574–576 (1959).

Karrer: Organic Chemistry, Sec. Eng. ed., pp. 93–102 (1946), Elsevier Pub. Co.

Shapiro et al.: Journal Am. Chem. Soc., vol. 81, pp. 3728–3736 (1959).

A. LOUIS MONACELL, *Primary Examiner.*

WILLIAM BUTLER, NICHOLAS S. RIZZO, *Examiners.*

R. PRICE, L. M. SHAPIRO, *Assistant Examiners.*